United States Patent
Barciela et al.

(10) Patent No.: US 9,770,693 B2
(45) Date of Patent: Sep. 26, 2017

(54) HOMOGENIZATION APPARATUS FOR AT LEAST TWO FLUID FLOWS, IN PARTICULAR FOR HOMOGENEOUS GAS/AIR MIXING IN A GAS ENGINE

(71) Applicant: MAN Truck & Bus AG, München (DE)

(72) Inventors: Bruno Barciela, Nürnberg (DE); Joachim Weiβ, Oberasbach (DE)

(73) Assignee: MAN TRUCK & BUS AG, Munich (DE)

(*) Notice: Subject to any disclaimer, the term of this patent is extended or adjusted under 35 U.S.C. 154(b) by 363 days.

(21) Appl. No.: 14/665,827

(22) Filed: Mar. 23, 2015

(65) Prior Publication Data
US 2015/0265978 A1 Sep. 24, 2015

(30) Foreign Application Priority Data
Mar. 24, 2014 (DE) .................. 10 2014 004 133

(51) Int. Cl.
| | | |
|---|---|---|
| *B01F 3/02* | (2006.01) | |
| *F02M 25/07* | (2006.01) | |
| *B01F 5/06* | (2006.01) | |
| *F02M 21/02* | (2006.01) | |
| *B01F 5/00* | (2006.01) | |
| *F02M 26/19* | (2016.01) | |

(52) U.S. Cl.
CPC .............. *B01F 3/02* (2013.01); *B01F 5/0065* (2013.01); *B01F 5/0605* (2013.01); *B01F 5/0615* (2013.01); *F02M 21/0218* (2013.01); *F02M 26/19* (2016.02); *B01F 2005/0636* (2013.01); *Y02T 10/32* (2013.01)

(58) Field of Classification Search
CPC ........ B01F 3/02; B01F 5/0605; B01F 5/0065; B01F 5/0615; B01F 2005/0636; F02M 25/0722; F02M 21/0218; F02M 26/19
See application file for complete search history.

(56) References Cited

U.S. PATENT DOCUMENTS

| | | | |
|---|---|---|---|
| 7,793,490 B2 | 9/2010 | Amon | |
| 2009/0067988 A1* | 3/2009 | S. Eluripati | B01F 3/02 415/116 |
| 2009/0197753 A1* | 8/2009 | Lajtonyi | B04C 5/04 494/42 |

(Continued)

FOREIGN PATENT DOCUMENTS

EP    1 908 932 A2    4/2008

*Primary Examiner* — Jacob Amick
(74) *Attorney, Agent, or Firm* — Lucas & Mercanti, LLP (57) ABSTRACT

A homogenization apparatus for at least two fluid flows for homogeneous gas/air mixing in a gas engine, in which at least two fluid feed lines conducting different fluid flows and one fluid outflow line conducting the homogenized fluid are connected to a central homogenization space as mixing region. In a connection region upstream of the homogenization space, the fluid feed lines have in each case one line section with a flow deflection in one direction with a flow deflection which follows downstream in the other direction and are connected in such a way that the fluid flows are fed tangentially to the homogenization space with a swirl movement imparted to them, in such a way that a rotating, turbulent flow which assists the homogenization process is formed in the homogenization space.

20 Claims, 8 Drawing Sheets

(56) References Cited

U.S. PATENT DOCUMENTS

| | | | | |
|---|---|---|---|---|
| 2012/0314526 A1* | 12/2012 | Shah | .................. | B01F 3/02 |
| | | | | 366/101 |
| 2015/0192095 A1* | 7/2015 | Lazich | ............... | F02M 25/0722 |
| | | | | 366/163.2 |

* cited by examiner

HOMOGENIZATION APPARATUS FOR AT LEAST TWO FLUID FLOWS, IN PARTICULAR FOR HOMOGENEOUS GAS/AIR MIXING IN A GAS ENGINE

CROSS REFERENCE TO RELATED APPLICATIONS

The present application claims priority of DE 10 2014 004 133.6, filed Mar. 24, 2014, which is incorporated herein by reference.

BACKGROUND OF THE INVENTION

The invention relates to a homogenization apparatus for at least two fluid flows, in particular for homogeneous gas/air mixing in a gas engine.

The generally known fundamental arrangement of a homogenization apparatus of this type includes a central homogenization space as mixing region, to which two fluid feed lines, which in each case conduct different fluid flows, and one fluid outflow line which conducts the homogenized fluid are connected. Mixing of the two fluid flows which is as intensive as possible is to take place in the homogenization space.

To this end, EP 1 908 932 A1 has disclosed an exhaust gas system for diesel vehicles having a first and a second parallel section which can be connected on the outlet side to an internal combustion engine. The parallel sections are connected by way of their ends which point downstream to an SCR catalytic converter. An injection device for a reducing agent is provided on a parallel section. In a homogenization apparatus which is connected upstream of the catalytic converter, the exhaust gas flow which has the reducing agent added to it is mixed with the exhaust gas flow which is free of reducing agent. Here, guide plates with and without hole structures are installed in a mixing chamber in order to promote thorough mixing and/or the exhaust gas flows are diverted by way of curved chamber cross-sectional shapes. The feed of the exhaust gas flows in the connection region upstream of the mixing chamber takes place in a rectilinear manner and the devices for promoting the thorough mixing are assigned here to the mixing chamber. The measures which are used here and further generally known measures for promoting thorough mixing, such as guide plates, baffle surfaces, perforated plates, diffuser devices lead to a relatively high pressure loss which is usually unfavourable in an undesired manner.

BRIEF SUMMARY OF THE INVENTION

It is an object of the invention to develop a homogenization apparatus of the generic type in such a way that intensive thorough mixing of two fluid flows is achieved with a pressure loss which is as low as possible.

It is provided according to the invention that, in the connection region of the homogenization space, the fluid feed lines have in each case one line section with a flow deflection in one direction with a flow deflection which follows downstream in the other direction and are connected there in such a way that the fluid flows are fed tangentially to the homogenization space with a swirl movement imparted to them which is preferably on opposite surfaces, in such a way that a rotating, turbulent flow which assists the homogenization process is formed in the homogenization space. The fluid dynamics of the fluid flows are therefore utilized here to generate the turbulence which promotes thorough mixing. The known complex elaborate measures mentioned at the outset by way of baffle plates, perforated structures, complicated chamber inner surfaces can be dispensed with as a rule according to the invention. Efficient homogenization is therefore achieved according to the invention with a relatively low pressure loss by way of a relatively simple and inexpensive apparatus with a low space requirement.

In a specific homogenization apparatus in this regard, in a three-limb, Y-shaped fluid line arrangement, the center lines of the fluid feed lines, and optionally the center line of the fluid outflow line, define a reference plane. Directly upstream of the homogenization space and upstream of the combining point of the two fluid flows to be mixed, the first of the two fluid feed lines has an elbow which bends away upwards with regard to the reference plane and the other second fluid feed line has an elbow which bends away downwards with regard to the reference plane and in each case one deflection which follows downstream in the other direction. As a result of this elbow guidance in an "S-shape", a tangential combination of the two fluid flows is achieved with an additionally imparted swirl movement in opposite directions which promotes the thorough mixing in the homogenization space.

Depending on the conditions, the elbow shape can have approximately an elongate Z-shape or an elongate S-shape and transitional shapes which lie in between. An elbow in the Z-shape straightens out downstream at the inflow opening to the homogenization space offset approximately parallel to the reference plane, with the result that the two inflow openings of the fluid feed lines lie offset on both sides with regard to the reference plane. In the case of an elbow in an S-shape, it bends away again towards the reference plane in each case upstream of the associated inflow opening, with the result that both inflow openings lie in the reference plane or offset with respect to one another only slightly in relation to the reference plane.

In a specific first embodiment, the homogenization space is configured as a mixing section, the two fluid feed lines being arranged and connected at the mixing section inlet such that they lie above one another in each case in a twisted manner with an S-shaped elbow. This twisting structure is continued in the mixing section in a tubular internal screw structure as internal screw thread for a further imparted swirl movement in the combined fluid. As a result, further intensive thorough mixing is promoted in the mixing section with a relatively low pressure loss. The spiral web structure of the internal screw thread is used here for swirl generation with simultaneous further movement of the fluid in the outflow direction.

Particularly effective thorough mixing with a relatively low pressure loss is achieved if the approach angle of the internal screw thread, just like the tangential angle, is from 15° to 20°. To this end, the internal screw thread of the mixing section should have from 2 to 6 screw turns, preferably 3 screw turns.

In a second, satisfactorily functional embodiment of a homogenization apparatus, the homogenization space is configured as a mixing chamber with a domed internal volume which merges with a circular cross section into the fluid outflow line. The two fluid feed lines are connected to the mixing chamber with an elbow in an elongate Z-shape, so as to lie next to one another and offset vertically with respect to one another with regard to the reference plane. In this way, a tangential and vertically offset feed of the two fluid flows with additional imparting of a swirl movement in opposite directions into the mixing chamber is achieved.

Particularly satisfactory mixing results with low pressure losses are achieved if the tangential angle is from 20° to 30°. In addition, the vertical offset with regard to the reference plane should be in each case from 10 mm to 20 mm.

A further third embodiment is configured similarly to the second embodiment, the domed interior of the mixing chamber being of overall spherical configuration, however, with a largely circular cross section. The two fluid feed lines are connected here in an elbow shape to the mixing chamber in such a way that tangential feeding of the two fluid flows with no vertical offset or with only a small vertical offset with regard to the reference plane into the mixing chamber takes place. A particularly satisfactory mixing result with a relatively low pressure loss is also achieved in the third embodiment if the tangential angle is from 20° to 30°.

In a fourth satisfactorily functional embodiment, the homogenization space is configured as a mixing chamber with an approximately elliptical cross section and a flattened chamber shape. The two fluid feed lines are connected in each case by way of an elbow to the mixing chamber, in such a way that the two elbows are directed towards one another on the end side with an elbow curvature in a plan view of the mixing chamber, the elbows being connected in said plan view to the mixing chamber at inflow openings which lie opposite one another. In addition, the two elbows are connected in each case to the mixing chamber with a further elbow curvature with regard to the plane so as to be offset vertically and lie opposite the flattened portion, with the result that a tangential vertically offset combination of the two fluid flows takes place with an imparted swirl movement in opposite directions. The tangential angle should be from 5° to 15° here.

By way of narrowing of the outflow area of the homogenization space, in particular as a constriction at the fluid outflow line, the flow speed can be increased there, as a result of which the homogeneous distribution of the two fluids to be mixed is aided. However, the pressure loss also increases with this measure. This measure can be used, in particular, in embodiments 2, 3 and 4. An improvement in the mixing ratio while avoiding excessively high pressure losses is therefore achieved, in particular, if the local constriction of a defined cross section of the fluid outflow line is smaller than said cross section by a factor of 0.8±0.1.

One of the above homogenization apparatuses is particularly preferably used for mixing combustion gas and air as a constituent part of an intake system of a gas engine upstream of a combustion chamber.

BRIEF DESCRIPTION OF THE DRAWINGS

Exemplary embodiments of the invention will be explained in greater detail using a drawing, in which.

DETAILED DESCRIPTION OF THE DRAWINGS

Figures 1A, 1C, 1D, 1E:
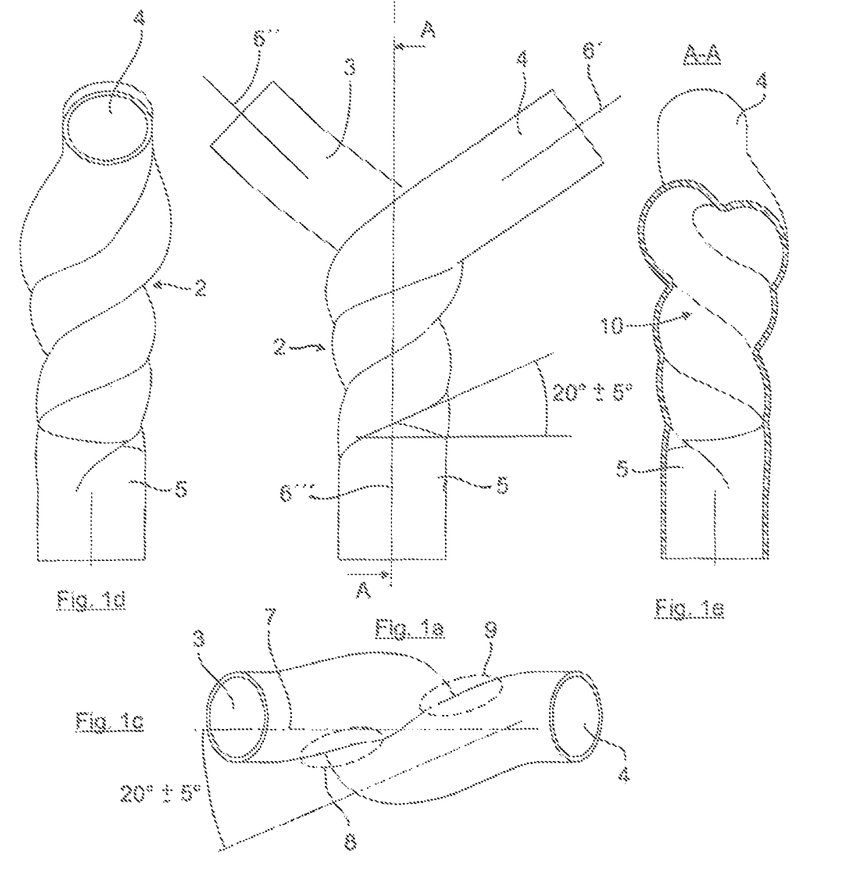
FIGS. 1a to 1d and 1f show views of a first embodiment of the present invention from different directions and FIG. 1e and FIG. 1g show cross sections thereof.
Figure 1B:
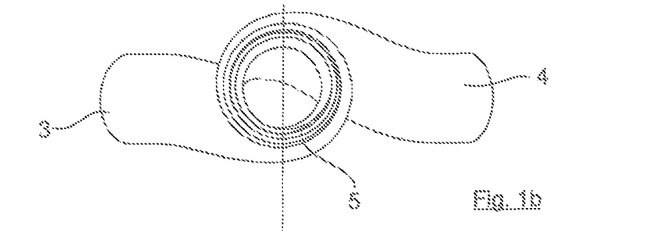
Figure 1F:
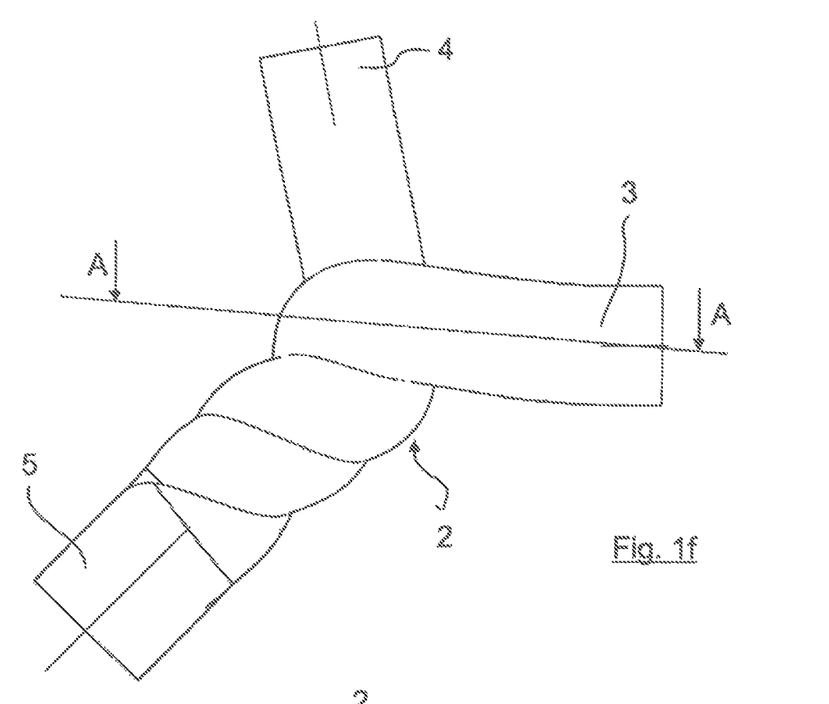
Figure 1G:
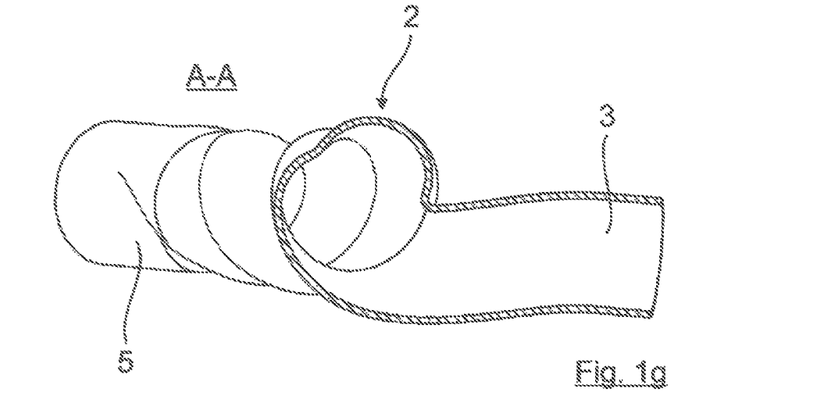

FIGS. 1a-1g show a first embodiment of a homogenization apparatus 1. The plan view according to FIG. 1a shows a three-limb fluid line arrangement in a Y-shape with a central harmonization space as mixing section 2, to which a first fluid feed line 3 and a second fluid feed line 4 are connected on the inlet side and a fluid outflow line 5 is connected on the outlet side. It can be seen, in particular, from FIG. 1c with a view in the direction of the fluid feed lines 3, 4 that the center lines 6', 6", 6''' define a reference plane 7, to which the line course which is described in the following text makes reference:

Immediately upstream of the mixing section 2, the first fluid feed line 3 has an elbow in the region 8 which bends away upwards with regard to the reference plane 7 with a deflection which then follows downstream in the other direction into the mixing section 2.

Correspondingly, in the region 9, the second fluid feed line 4 has an elbow which bends away downwards with regard to the reference plane 7 with a deflection which follows downstream in the other direction. These elbow courses of the fluid feed lines 3, 4 can also be seen clearly from FIG. 1b, a view in the direction of the fluid outflow line 5, and likewise from the sectional illustration according to FIG. 1g. In addition, the tangential angle is illustrated at 20°±5° in FIG. 1c.

According to FIG. 1c, the two fluid feed lines 3, 4 lie above one another such that they are twisted in each case with an S-shaped elbow region, said twisting structure continuing in the mixing section 2 in a tubular internal screw structure as internal screw thread 10 with three screw turns, as can be seen from the cross section according to FIG. 1e.

As a result of the elbow-shaped configuration shown of the fluid feed lines at or upstream of the inlet of the mixing section 2, a tangential combination of the two fluid flows which flow therein takes place with an additionally imparted swirl movement which promotes thorough mixing. Said swirl movement is continued in the spiral internal screw thread 10 for further intensive thorough mixing. The screw structure on the inner wall of the mixing section 2 is therefore essential. It can be seen from the views of FIGS. 1a and 1d and from the view from below according to FIG. 1f that the mixing section 2 is configured with an identical wall thickness overall and therefore also such that it is twisted from the outside. This can be configured in this way, in particular, owing to manufacturing in a casting or stamping process. However, the inner-side screw structure with the three thread turns and the approach angle of the screw thread of 20°±5° is essential for the swirl-imparting function.

Figures 2A, 2D, 2E:
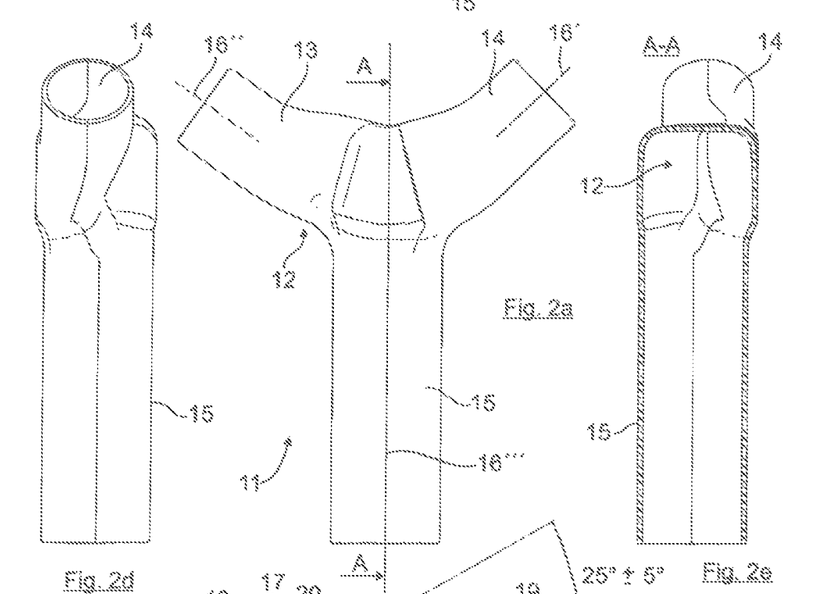
FIGS. 2a to 2d and 2f show views of a second embodiment of the present invention from different directions and FIG. 2e and FIG. 2g show cross sections thereof.
Figure 2B:
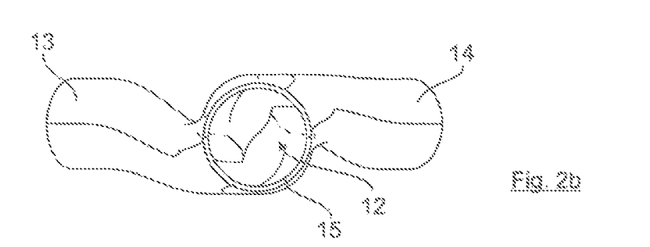
Figure 2C:
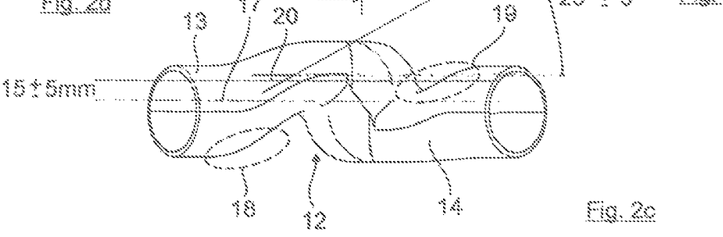
Figure 2F:
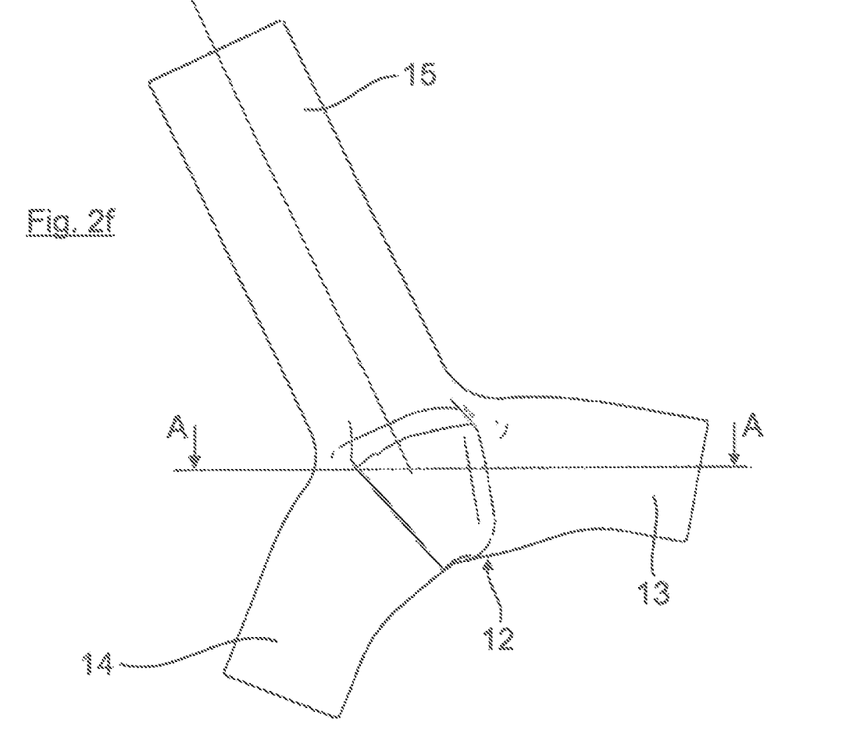
Figure 2G:
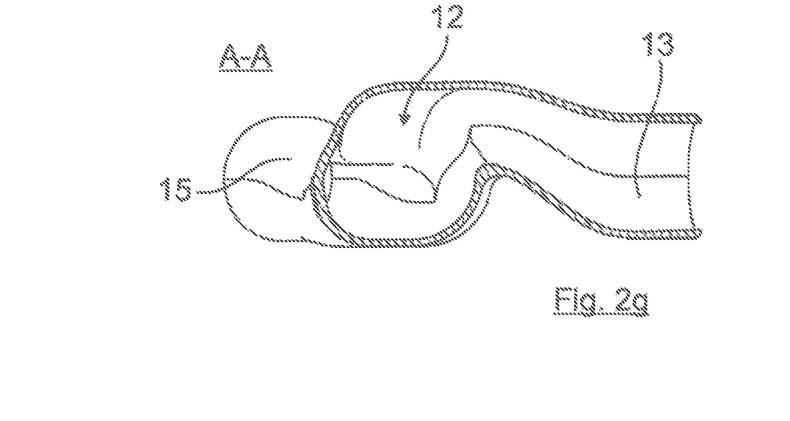

FIGS. 2a-2g show a second embodiment of a homogenization apparatus 11, there also being a three-limb fluid line arrangement in a Y-shape here, and a first fluid feed line 13, a second fluid feed line 14 and a fluid outflow line 15 being connected to a central homogenization space as mixing chamber 12. The center lines 16', 16" of the fluid feed lines 13, 14 and the center line 16''' of the fluid outflow line 15 define a reference plane 17, to which the elbow-shaped line course in the connecting region makes reference:

As can be seen from FIG. 2c, the first fluid feed line 13 bends (upwards) with regard to the reference plane 17 and runs further in an elongate Z-shape in the other direction, with the result that the center line 20 lies offset at the inflow opening of the mixing chamber 12 by the illustrated spacing 15 mm±5 mm with regard to the reference plane 17. As can likewise be seen from FIG. 2c, the second fluid feed line 14 is routed in the region 19 so as to bend away in the other direction and is correspondingly connected to the mixing chamber with a deflection in the other direction for tangential and vertically offset feeding of the two fluid flows with additional imparting of a swirl movement in opposite directions. The suitable tangential angle is illustrated with 25°±5° here. As can be seen from FIG. 2b in conjunction with the cross section according to FIG. 2g, the mixing chamber 12 has a domed, but not spherical inner contour which, however, merges with a circular cross section into the fluid outflow line 15.

Figures 3A, 3C, 3D, 3E:
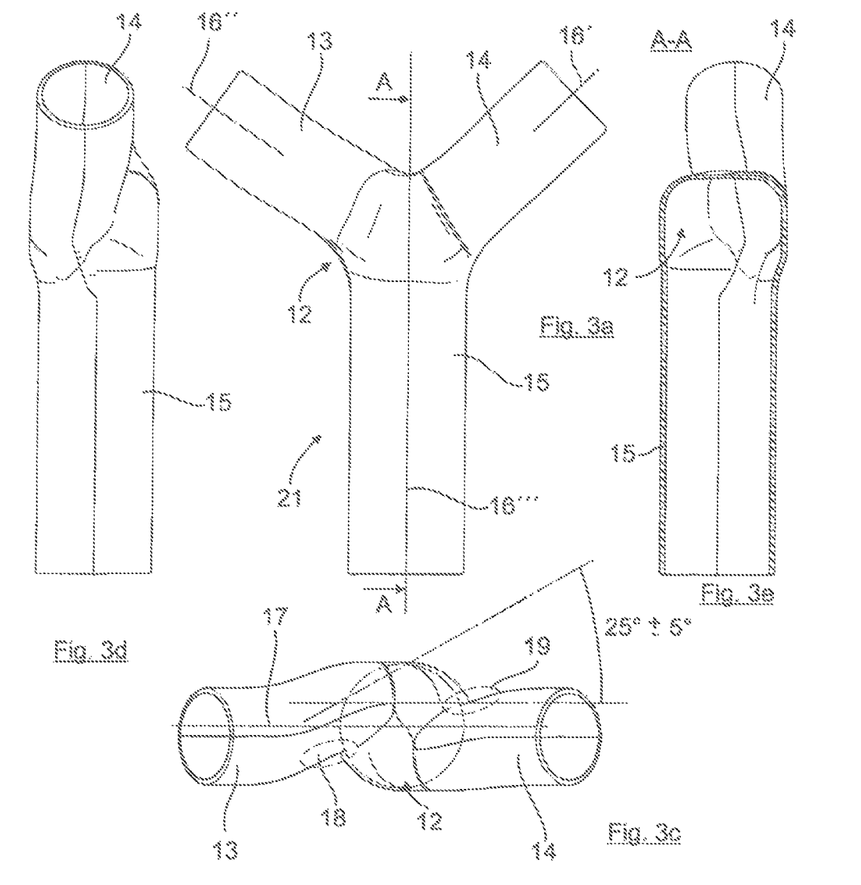
FIGS. 3a to 3d and 3f show views of a third embodiment of the present invention from different directions and FIG. 3e and FIG. 3g show cross sections thereof.
Figure 3B:
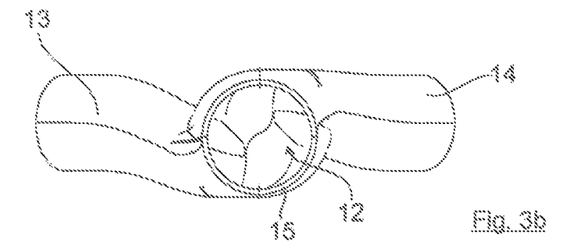
Figure 3F:
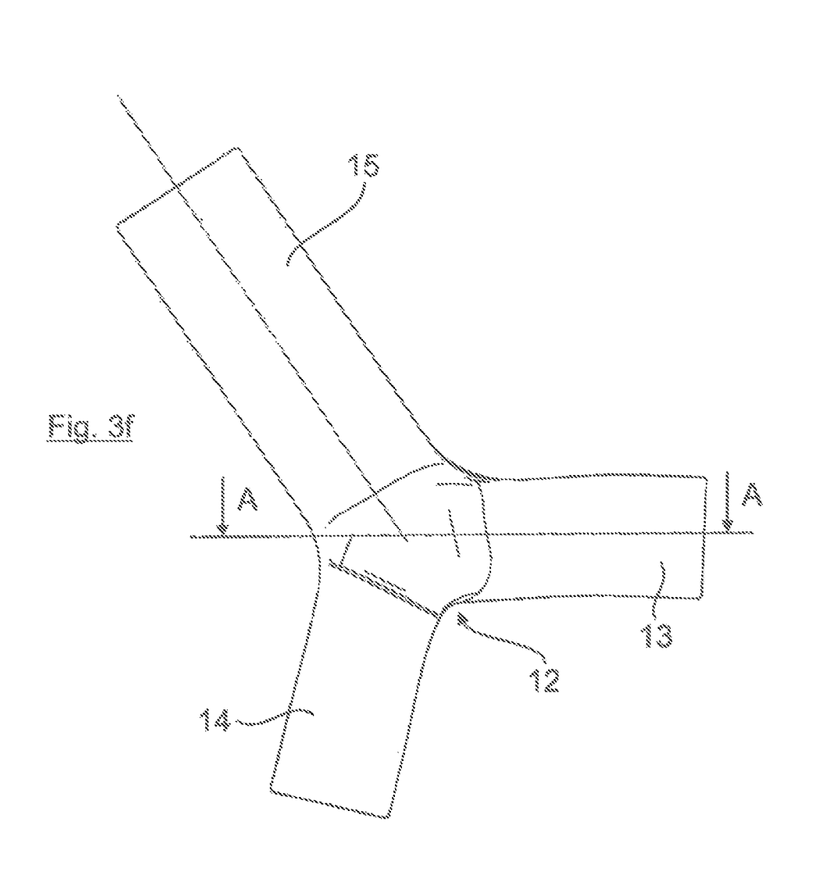
Figure 3G:
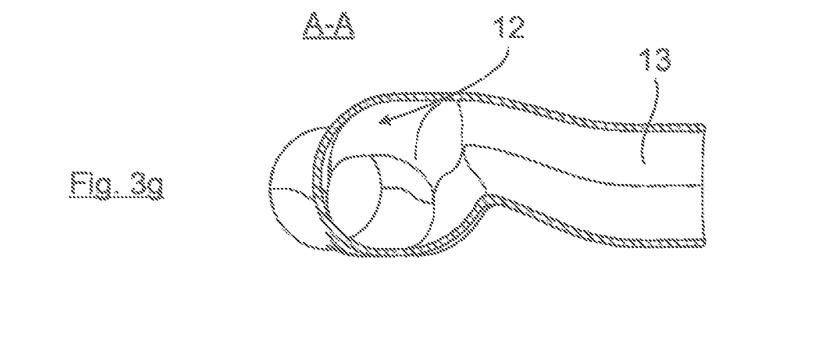

FIGS. 3a-3g show a third embodiment of a homogenization apparatus 21 which corresponds substantially to the second embodiment 11 according to FIGS. 2a-2g, with the result that the same reference numerals are used in FIGS. 3a-3g and the associated individual illustrations and only the differences from the second embodiment will be explained in the following text: in the third embodiment, as can be seen, in particular, from FIGS. 3b, 3c and 3g, the bent-away portion is of comparatively less steep configuration and the interior of the mixing chamber 12 is of overall more spherical configuration with a largely circular cross section. As a result, in the third embodiment in FIG. 3c, there is no eccentricity or vertical offset illustrated in FIG. 2c or only a small eccentricity or small vertical offset. This shows that an adaptation to individual conditions is possible, in particular, in a variation of the geometric features.

FIGS. 4a-4g show a fourth embodiment of a homogenization apparatus 22 with a central mixing chamber 23, to which a first fluid feed line 24, a second fluid feed line 25 and a fluid outflow line 26 are connected in a three-limb line arrangement. The mixing chamber 23 is configured as a flattened can shape with an approximately elliptical cross section. The two fluid feed lines 24, 25 are connected to the mixing chamber 23 in each case by way of an elbow 27, 28. As can be seen, in particular, from FIGS. 4a and 4f, the two elbows 27, 28 are directed towards one another on the end side in a plan view of the mixing chamber 23, the elbows 27, 28 being connected to the mixing chamber 23 at inflow openings which lie approximately opposite one another in said plan view.

Figure 4A:
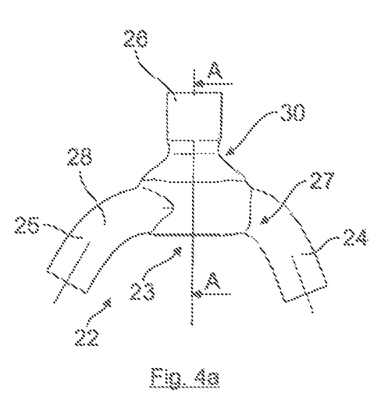
FIGS. 4a to 4d and 4f show views of a fourth embodiment of the present invention from different directions and FIG. 4e and FIG. 4g show cross sections thereof.
Figure 4B:
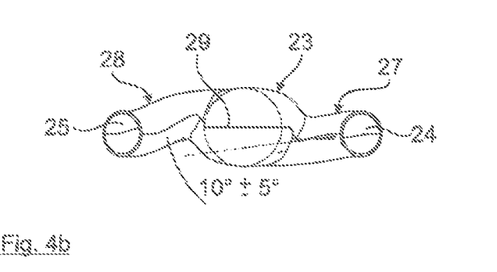
Figure 4C:
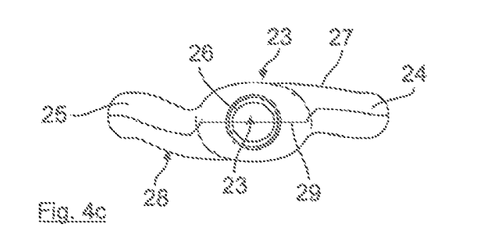
Figure 4D:
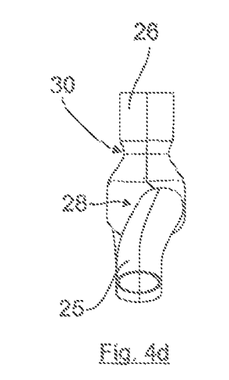
Figure 4E:
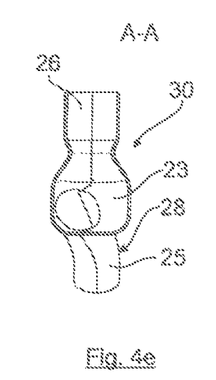
Figures 4F, 4G:
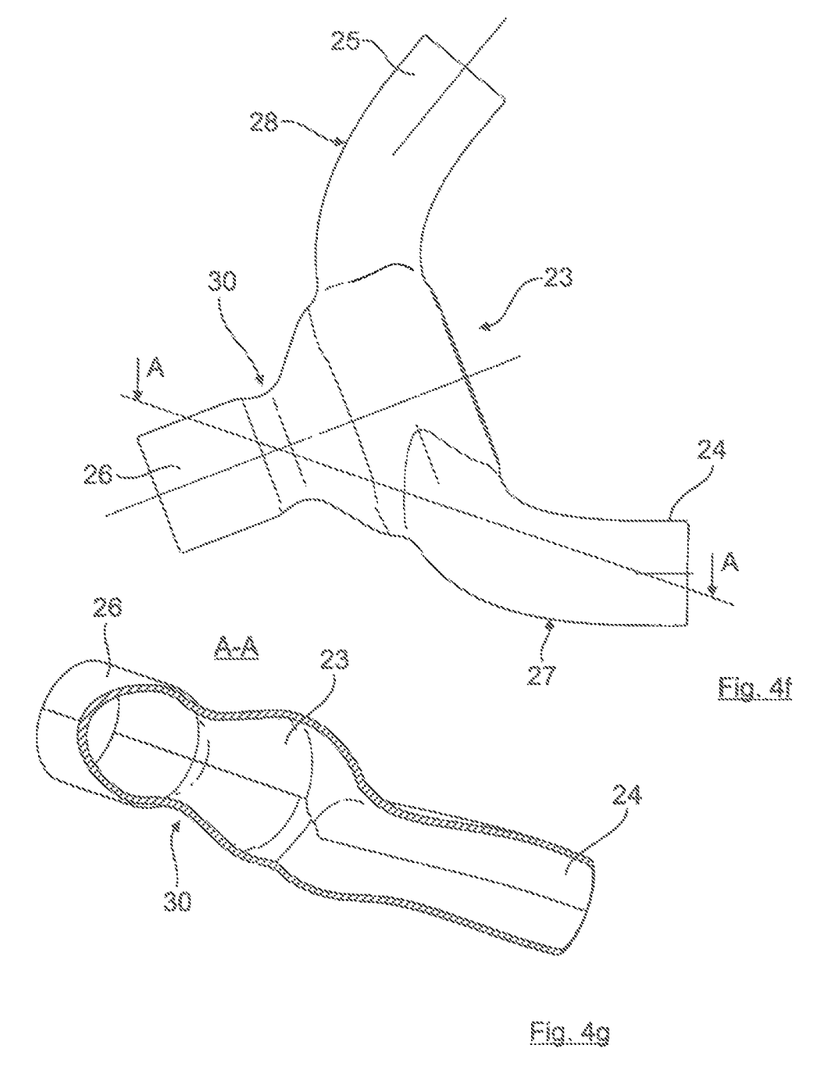

As can be seen, in particular, from FIGS. 4b and 4c, both elbows are connected to the mixing chamber 23 in a vertically offset manner in each case by way of a further elbow curvature with regard to the center plane 29 of the flattened portion or the elliptical cross section. The elbow curvature bends upwards or downwards in each case with regard to the center plane 29 with a subsequent reversal into the mixing chamber 23, with the result that a tangential vertically offset combination of the two fluid flows from the fluid feed lines 24, 25 takes place with an imparted swirl movement in opposite directions as a result of said elbow courses. A suitable tangential angle is illustrated with 10°±5° in FIG. 4b.

In addition, local narrowing of the outflow area is produced here as a circumferential constriction 30 in comparison with the adjoining fluid outflow line 26 at the outlet of the mixing chamber 23. Here, the diameter is smaller by the factor of 0.8±0.1 than the cross section of the fluid outflow line 26 and is used for a local increase in the flow speed which promotes the thorough mixing.

LIST OF REFERENCE NUMERALS

1 Homogenization apparatus, 1st embodiment
2 Mixing section
3 First fluid feed line
4 Feed line
5 Fluid outflow line
6', 6", 6'" Center lines
7 Reference plane
8 Region
9 Region
10 Internal screw thread
11 Homogenization apparatus, 2nd embodiment
12 Mixing chamber
13 First fluid feed line
14 Second fluid feed line
15 Fluid outflow line
16', 16", 16'" Center lines
18 Reference plane
18 Region
19 Region
20 Center line
21 Homogenization apparatus, 3rd embodiment
22 Homogenization apparatus, 4th embodiment
23 Mixing chamber
24 First fluid feed line
25 Second fluid feed line
26 Fluid outflow line
27 Elbow
28 Elbow
29 Center plane
30 Constriction

The invention claimed is:

1. A homogenization apparatus for at least two fluid flows, comprising:
   two fluid feed lines conducting different fluid flows;
   a fluid outflow line;
   the homogenization apparatus defining a central homogenization space as a mixing region connected to said two fluid feed lines and said fluid outflow line,
   each of the two fluid feed lines having a connection region upstream of the homogenization space having a first flow deflection in a first direction and a second flow deflection in a second direction opposite of the first direction, and
   each of the two fluid feed lines are connected to the homogenization space such that the fluid flows exiting the each of the two fluid feed lines are fed tangentially to the homogenization space with a swirl movement imparted to the fluid flows, whereby a rotating turbulent flow facilitating a homogenization process is formed in the homogenization space.

2. The homogenization apparatus according to claim 1, wherein the two fluid feed lines and the fluid outflow line are arranged in a three-limb, Y-shaped fluid line arrangement, center lines of the fluid feed lines define a reference plane, and directly upstream of the homogenization space and upstream of a combining point of the two fluid flows, a first fluid feed line of the two fluid feed lines has an elbow comprising the first deflection and the second deflection of the first fluid feed line that bends away from the reference plane and a second fluid feed line of the two fluid feed lines has an elbow comprising the first deflection and the second deflection of the second fluid feed line that bends away from the reference plane, wherein the elbows promote the swirl movement in opposite directions which promotes the thorough mixing in the homogenization space.

3. The homogenization apparatus according to claim 2, wherein the center line of the fluid outflow line also defines the reference plane.

4. The homogenization apparatus according to claim 2, wherein each of the elbows is Z-shaped, such that the each of the elbows straightens out at an associated inflow opening offset approximately parallel to the reference plane and the two associated inflow openings lie offset on both sides with regard to the reference plane at the homogenization space.

5. The homogenization apparatus according to claim 2, wherein each of the elbows is S-shaped, such that the elbow straightens out in each case upstream of an associated inflow opening such that it bends away towards the reference plane.

6. The homogenization apparatus according to claim 2, wherein the homogenization space is configured as a mixing section, the two fluid feed lines being arranged and connected at a mixing section inlet such that they lie one on the other in a twisted arrangement with an S-shaped elbow at the connection region, and wherein the mixing section has a tubular internal screw structure in the form of an internal screw thread as a continuance of the twisted arrangement of the two fluid feed lines.

7. The homogenization apparatus according to claim 6, wherein an approach angle of the internal screw thread is from 15° to 20°.

8. The homogenization apparatus according to claim 6, wherein the internal screw thread has 2 to 6 screw turns.

9. The homogenization apparatus according to claim 6, wherein the internal screw thread has 3 screw turns.

10. The homogenization apparatus according to claim 2, wherein the homogenization space is configured as a mixing chamber with a domed internal volume that merges with a circular cross section into the fluid outflow line, each of the two fluid feed lines being connected to the mixing chamber with an elbow that is Z-shaped, so as to lie next to one another and offset vertically with respect to one another with regard to the reference plane for a tangential and vertically offset feed of the two fluid flows with additional imparting of a swirl movement in opposite directions.

11. The homogenization apparatus according to claim 10, wherein the vertical offset of the centers of the inflow openings of the fluid feed lines is in each case from 10 mm to 20 mm with regard to the reference plane.

12. The homogenization apparatus according to claims 10, wherein a tangential angle is from 20° to 30°.

13. The homogenization apparatus according to claim 2, wherein the homogenization space is configured as a mixing chamber with a domed, spherical interior with a cross section which is largely circular overall and merges into the fluid outflow line, and the two fluid feed lines are connected in an elbow shape to the mixing chamber such that tangential feeding of the two fluid flows takes place into the mixing chamber with no or only a small vertical offset with regard to the reference plane.

14. The homogenization apparatus according to claims 13, wherein a tangential angle of the tangential feeding is from 20° to 30°.

15. The homogenization apparatus according to claim 1, wherein the homogenization space is configured as a mixing chamber with an approximately elliptical cross section and a flattened chamber shape, the two fluid feed lines being connected to the mixing chamber by an elbow, the elbows being directed towards one another on the end side with an elbow curvature in a plan view of the mixing chamber, the elbows being connected in said plan view to the mixing chamber at inflow openings which lie opposite one another, and the elbows being connected in each case to the mixing chamber with a further elbow curvature with regard to a center plane so as to be offset vertically and lie opposite the flattened portion, with the result that a tangential vertically offset combination of the two fluid flows takes place with an imparted swirl movement in opposite directions.

16. The homogenization apparatus according to claim 15, wherein a tangential angle of the fluid flows is from 5° to 15°.

17. The homogenization apparatus according to claim 2, wherein the fluid outflow line has a local constriction of an outflow area at an outlet of the homogenization space.

18. The homogenization apparatus according to claim 17, wherein the local constriction is smaller than a cross section of the fluid outflow line by a factor of 0.8±0.1.

19. The homogenization apparatus according to claim 1, wherein the homogenization apparatus is a constituent part of an intake system of a gas engine for mixing combustion gas and air upstream of a combustion chamber of the gas engine.

20. A vehicle having a homogenization apparatus according to claim 19.

* * * * *